United States Patent [19]

Fuchs

[11] 3,783,148

[45] Jan. 1, 1974

[54] PROCESS FOR THE PREPARATION OF SYMMETRICAL AZO COMPOUNDS

[75] Inventor: Julius J. Fuchs, Wilmington, Del.

[73] Assignee: E. I. du Pont de Nemours and Company, Wilmington, Del.

[22] Filed: Aug. 31, 1971

[21] Appl. No.: 176,701

Related U.S. Application Data

[63] Continuation-in-part of Ser. No. 16,950, March 5, 1970, abandoned, which is a continuation-in-part of Ser. No. 644,097, June 7, 1967, abandoned, which is a continuation-in-part of Ser. No. 393,766, Sept. 1, 1964, abandoned.

[52] U.S. Cl. ................................................. 260/192
[51] Int. Cl. .......................................... C07c 107/00
[58] Field of Search ..................................... 260/192

[56] References Cited
UNITED STATES PATENTS 2,713,576   7/1955   DeBenneville ..................... 260/192
3,207,714   9/1965   DeBenneville et al. .......... 260/192 X
3,390,146   6/1968   Nield et al. ......................... 260/192

Primary Examiner—Lewis Gotts
Assistant Examiner—C. F. Warren
Attorney—Paul R. Steyermark

[57] ABSTRACT

An improved process for the preparation of symmetrical azo compounds comprising coupling the corresponding amino compound, such as 1-aminocyclohexanecarbonitrile in the presence of a hypochlorite, such as sodium hypochlorite, in a solvent containing at the beginning of the reaction at least 95 percent by volume and at the end of the reaction at least 70 percent by volume of a $C_1$–$C_2$ alcohol at a temperature between the freezing point of the reaction mixture and 50°C.

8 Claims, No Drawings

PROCESS FOR THE PREPARATION OF SYMMETRICAL AZO COMPOUNDS

CROSS REFERENCE TO RELATED APPLICATIONS

This application is a continuation-in-part of my copending application Ser. No. 16,950, filed Mar. 5, 1970, now abandoned which was a continuation-in-part of my then copending application Ser. No. 644,097, filed June 7, 1967, now abandoned, which in turn was a continuation-in-part of my then copending application Ser. No. 393,766, filed Sept. 1, 1964, now abandoned.

BACKGROUND OF THE INVENTION

This invention relates to an improved process for the preparation of symmetrical azo compounds.

The preparation of azo compounds is known in the art, as disclosed, for example, in Anderson, U.S. Pat. No. 2,711,405 issued June 21, 1955, De Benneville, U.S. Pat. No. 2,713,576, issued July 19, 1955 and U.S. Pat. No. 3,207,714, issued Sept. 21, 1965, and Hunt, U.S. Pat. No. 2,471,959, issued May 31, 1949.

Although the process as disclosed in the Anderson patent is useful for the preparation of such azonitriles as the one prepared from 2-amino-2-methylpropionitrile, the aqueous coupling process as disclosed in Anderson results in extremely poor yields when applied to amino compounds of higher molecular weight such as those of this invention. Similarly, the De Benneville U.S. Pat. No. 2,713,576 discloses a process for the preparation of symmetrical azo compounds but specifically limits it to the preparation of low molecular weight compounds, the yield decreasing as the molecular weight increases.

The De Benneville U.S. Pat. No. 3,207,714 teaches the preparation of azobis-alkylphosphonates by contacting the corresponding amines with hypochlorite in aqueous solution. This reference discloses that: "lower alcohols may be employed in order to increase the solubility of the α-aminoalkylphosphonate and the hypochlorite reactants." However, it does not suggest the use of alcohol as the major component of the reaction medium, nor does it suggest that the yield would be improved by beginning the reaction in a solvent which is at least 95 percent alcohol. De Benneville especially suggests the addition of t-butyl alcohol to his strong hypochlorite salt solutions to keep the system homogeneous. In U.S. Pat. No. 2,713,576 both t-butyl alcohol and t-amyl alcohol are recommended. It has been found, however, contrary to the teaching of the above references, that when t-butyl alcohol is added to strong hypochlorite solutions under the conditions described therein for the preparation of azo compounds, separation into two liquid layers takes place. The system thus is no longer homogeneous, apparently because of salting out of t-butyl alcohol. Lower yields of azo compounds are obtained in such heterogeneous systems. The same difficulty occurs with n-butyl alcohol and other $C_4$ and higher alcohols.

Other processes for the preparation of azo compounds, such as the process disclosed in Hunt, have other apparent drawbacks. The Hunt process, for example, requires hydrazine or derivatives of hydrazine as a raw material, which results in an extremely expensive product.

SUMMARY OF THE INVENTION

According to this invention, there is provided an improved process for the preparation of azo compounds having the following Formula (1):

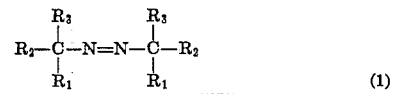
(1)

wherein $R_1$ is alkyl of from one to six carbon atoms, optionally substituted with an alkoxy group of one to four carbon atoms; $R_2$ is cycloalkyl of from three to six carbon atoms or alkyl of from one to six carbon atoms; $R_3$ is a radical selected from the group consisting of —CN, —COOR, and —COOM, where R is an alkyl radical of from one to six carbon atoms, and M is sodium or potassium; with the proviso that $R_1$ and $R_2$ together contain a total of at least four carbon atoms, and with the further proviso that $R_1$ and $R_2$ can be taken together and are alkylene of from three to 11 carbon atoms.

In this process two molecules of an amino compound of the following formula (2)

(2)

wherein $R_1$, $R_2$ and $R_3$ are as defined above in formula (1), are coupled to form compounds of formula (1) in the presence of a hypochlorite, at a temperature above the freezing point of the reaction mixture and below 50°C., the reaction solvent containing at the beginning of the reaction at least 95 percent by volume and at the end of the reaction at least 70 percent by volume of a $C_1$–$C_2$ alcohol.

The azo products of this invention are very useful polymerization initiators and blowing agents and can be utilized in the many areas in which such agents are normally employed.

DESCRIPTION OF THE INVENTION

The reaction stoichiometry of the process of this invention can be represented by the following equation:

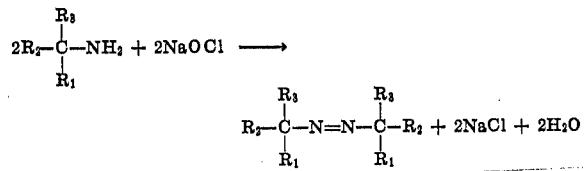

This reaction is believed to proceed through an intermediate step in which a chloroamine is formed.

The amino compounds used in this process can be obtained from commercial sources, or they can be prepared by methods well known in the art. The amount of amino compound used in the reaction mixture will depend upon the particular reactants but will normally range from about one-half to about 25 percent based on the total weight of the reactor charge. In order to obtain the most efficient reaction a preferred amount of amino compound is from about 2 to about 20 percent by weight.

The hypochlorite can be sodium, potassium, or calcium hypochlorite. The hypochlorite can be prepared first, then added to the reaction mixture or can be prepared in situ by reaction of chlorine and the appropriate hydroxide. For reasons of convenience and economy, sodium hypochlorite is preferred. The amount of the hypochlorite will be in excess of one mole per mole of amino compound used even though the reaction stoichiometry as shown in the equation, above, indicates a 1:1 requirement. The extra hypochlorite is required because side reactions between the hypochlorite and alcoholic solvent cannot be avoided.

For maximum reaction efficiency it is preferred to use more than 1.4 moles of the hypochlorite per mole of amino compound used. Some yield loss occurs when more than 1.8 moles of the hypochlorite per mole of amino compound are employed.

The solvent used in the process of this invention is a $C_1$–$C_2$ alcohol, i.e., methanol or ethanol. At the beginning of the reaction, the alcohol constitutes at least 95 percent by volume of the reaction solvent; at the end of the reaction, the alcohol concentration should be at least 70 percent by volume. Some water usually is present in the reaction medium, for instance, as solvent for sodium hypochlorite. The amount of alcohol depends on the strength of the hypochlorite; stronger solutions require less alcoholic solvent, but in the presence of lower concentrations of alcohol the intermediate chloramines oil out, causing the yields to decrease appreciably.

It is believed that the outstanding results which are obtained when using the $C_1$–$C_2$ alcohol solvents are due to their high compatibility with the high ionic strength of the reaction medium (due to high levels of sodium chloride). This high compatibility results in the formation of only one liquid phase which in turn improves the rate of the desired reaction and simplifies isolation of the azo product. The alcohols methanol and ethanol can be used either singly or in combination with each other. The preferred alcohol is methanol.

In the following text, whenever the term "aqueous solvent" is used, it is understood that the solvent contains some water, and not that the water constitutes a major part thereof.

Reaction Conditions

The reactants can be mixed in any suitable reaction vessel where they are agitated for a time sufficient for the reaction to go to completion. Ordinarily 60 minutes is a sufficient reaction time. In the broadest aspect of this invention, the hypochlorite solution is added to the solution of the amino compound in at least 95 percent by volume alcohol. Reverse order of addition, i.e., addition of the amino compound solution to the hypochlorite is detrimental to both the yield and purity of the resulting azo compound.

The lower operable temperature of the reaction is limited only by the freezing point of the reaction mixture, and the upper operable temperature is about 50°C. Usually, it is preferred to maintain the temperature between about −10° and 20°C. to control the reaction most easily and efficiently as well as obtain the highest yields and purity.

Although the amino compound and the hypochlorite can be added separately to the alcohol, it is preferred that the addition be simultaneous since the heat load is more easily controlled. If the amino compound is a liquid it may most conveniently be added "neat", that is in undiluted form. If the amino compound is a solid at room temperature, it may be dissolved or suspended in sufficient alcohol to facilitate delivery to the reaction mass.

In the preferred embodiment of this invention, the aqueous sodium hypochlorite solution and the α-amino compound are added simultaneously with stirring to the cold alcohol. The molar ratio of the sodium hypochlorite to the α-amino compound is maintained in the range of 1.4 to 1.8 during the entire course of the addition. During the addition, the temperature of the reaction mixture should be held below −5°C. The reactants should be added at the maximum rate compatible with this temperature requirement. When the addition of the reactants is complete, the temperature of the mixture is allowed to rise to between 5° and 10°C.

After heat evolution ceases, sufficient water is added at 5°–10°C. to adjust the alcohol/water ratio to 1 on a volume basis. At this ratio the sodium chloride (introduced with the aqueous NaOCl solution and produced during the reaction) is dissolved, and most of the azo product is precipitated; it can be isolated by filtration.

In order that the invention can be better understood, the following illustrative examples are given, wherein parts and percentages are by weight unless otherwise noted.

EXAMPLE 1

To a solution of 50 parts ethanol and 13.7 parts of 1-aminocyclohexanecarbonitrile 28 parts of 4.83 percent aqueous sodium hypochlorite at a temperature of 3° to 4°C. are added with agitation. This mixture is agitated for approximately 30 minutes while it warms to room temperature. At this point ethanol constitutes 70 volume percent of the aqueous solvent. The reaction mass is then poured into water. The solid 1,1'-azobis(cyclohexanecarbonitrile) of a melting point of 113°–114°C. is isolated by filtration in 81 percent yield. This compound is an exceptional polymerization initiator for ethylene, vinyl acetate and methyl methacrylate.

EXAMPLE 2

To a solution of 56.1 parts 2-amino-2-ethylbutyronitrile in 400 parts methanol at −10°C. is added with agitation, over the temperature range of −10° to 0°C., 50 parts chlorine gas with simultaneous addition of 61 parts of 50 percent aqueous sodium hydroxide at such a rate as to keep the pH of the reaction mixture between 8 and 12. After the chlorine has been added, an additional 51 parts of 50 percent sodium hydroxide is gradually introduced at 0° to 5°C. and the agitation continued for 15 minutes without further cooling. At this point methanol constitutes 88.5 volume percent of the aqueous solvent. The resulting reaction mixture is then diluted with 440 parts of water, and the precipitated 2,2'-azobis(2-ethylbutyronitrile) of a melting point of 74°–75°C. is isolated by filtration in 85 percent yield. This compound is an excellent polymerization initiator for vinyl chloride and acrylonitrile.

EXAMPLE 3

To a solution of 63.2 parts of 2-amino-2,4-dimethylpentanonitrile in 592 parts of methanol is added over a 20-minute period at −10° −5°C. with agitation 377 parts of a 15 percent aqueous sodium hypochlorite solution. The reaction is then allowed to warm to 10°C. and held for 10 minutes. At this point methanol constitutes 74 volume precent of the aqueous solvent. The resulting reaction product is diluted with 500 parts of water, and the precipitated 2,2'-azobis(2,4-dimethylpentanonitrile) of a melting point of 48°–52°C. is isolated by filtration in 75 percent yield. This compound is a useful polymerization initiator for ethylene, vinyl acetate, and methyl methacrylate.

EXAMPLE 4

To a mixture of 276 parts methanol and 129 parts of 10 percent aqueous calcium hypochlorite at −10°C. is added with agitation 15.6 parts of 2-amino-4-methoxy-2,4-dimethylpentanonitrile. The mixture is stirred for approximately 45 minutes while the temperature is allowed to rise to 10°C. At this point in the reaction methanol constitutes 75 volume percent of the aqueous solvent. Then, 232 parts of water are added and the solid 2,2'-azobis(4-methoxy-2,4-dimethylpentanonitrile) of a melting point of 103°–104°C. is isolated by filtration. This compound is useful as a polymerization initiator for vinyl chloride, acrylonitrile, ethylene, and methyl methacrylate.

EXAMPLE 5

By substituting molecular equivalent amounts of the amine starting materials shown below for the amine in Example 1, the corresponding azo product is obtained.

| Amine Starting Material | Azo Product |
|---|---|
| 2-amino-2-butylhexanonitrile | 2,2-azobis(2-butylhexanonitrile) |
| 2-amino-4-ethoxy-2,4-dimethylpentanonitrile | 2,2'-azobis(4-ethoxy-2,4-dimethylpentanonitrile) |
| 2-amino-2-methylpentanonitrile | 2,2'-azobis(2-methylpentanonitrile) |
| ethyl 2-amino-2-ethylbutyrate | 2,2'-azobis(ethyl 2-ethylbutyrate) |

These azo products are useful as polymerization initiators for vinyl chloride, acrylonitrile, and ethylene.

EXAMPLE 6

By substituting molecular equivalent amounts of the amine starting materials shown below for the amine in Example 2, the corresponding azo product is obtained.

| Amine Starting Material | Azo Product |
|---|---|
| 1-aminocyclobutanecarbonitrile | 1,1'-azobis(cyclobutanecarbonitrile) |
| 2-amino-4-butoxy-2,4-dimethylpentanonitrile | 2,2'-azobis(4-butoxy-2,4-dimethylpentanonitrile) |
| 2-amino-2-carboethoxypropionitrile | 2,2'-azobis(2-carboethoxypropionitrile) |
| 2-amino-7-chloro-2-ethylheptanonitrile | 2,2'-azobis(7-chloro-2-ethylheptanonitrile) |

These azo products have similar utility to that disclosed in Example 2.

EXAMPLE 7

By substituting molecular equivalent amounts of the amine starting material shown below for the amine in Example 3, the corresponding azo product is obtained.

| Amine Starting Material | Azo Product |
|---|---|
| 2-amino-2-methyloctanonitrile | 2,2'-azobis(2-methyloctanonitrile) |
| 2-amino-4-carboxy-2-methylbutyronitrile | 2,2'-azobis(4-carboxy-2-methylbutyronitrile) |
| 2-amino-2,4,4-trimethylpentanonitrile | 2,2'-azobis(2,4,4-trimethylpentanonitrile) |

These azo products are useful as polymerization initiators for such monomers as vinyl chloride, acrylonitrile, ethylene, and vinyl acetate.

EXAMPLE 8

By substituting molecular equivalent amounts of the amine starting material below for the amine in Example 3, the corresponding azo product is obtained.

| Amine Starting Material | Azo Product |
|---|---|
| 1-aminocyclooctanecarbonitrile | 1,1'-azobis(cyclooctanecarbonitrile) |
| 2-amino-4-carbomethoxy-2,4-dimethylpentanonitrile | 2,2'-azobis(4-carbomethoxy-2,4-dimethylpentanonitrile) |

These azo products are good polymerization initiators.

EXAMPLE 9

By substituting molecular equivalent amounts of the amine starting material below for the amine in Example 3, the corresponding azo product is obtained.

| Amine Starting Material | Azo Product |
|---|---|
| 2-amino-2-cyclopropylpropionitrile | 2,2'-azobis(2-cyclopropylpropionitrile) |
| 2-amino-3-methoxy-2-methylpropionitrile | 2,2'-azobis(3-methoxy-2-methylpropionitrile) |
| 2-amino-2,3,3-trimethylbutyronitrile | 2,2'-azobis(2,3,3-trimethylbutyronitrile) |
| sodium 2-amino-2-ethylbutyrate | 2,2'-azobis(sodium 2-ethylbutyrate) |

EXAMPLE 10

By substituting molecular equivalent amounts of the amine starting material below for the amine in Example 2, the corresponding azo product is obtained.

| Amine Starting Material | Azo Product |
|---|---|
| 1-aminocyclododecanecarbonitrile | 1,1'-azobis(cyclododecanecarbonitrile) |
| sodium 2,2-dimethyl-4-amino-4-cyanopentanoate | 4,4'-azobis(sodium 2,2,4-trimethyl-4-cyanopentanoate) |
| 2-amino-2-isopropyl-3-methylbutyronitrile | 2,2'-azobis(2-isopropyl-3-methylbutyronitrile) |

EXAMPLE 11

By substituting molecular equivalent amounts of the amine starting material below for the amine in Example 2, the corresponding azo product is obtained.

| Amine Starting Material | Azo Product |
|---|---|
| 2-amino-2-cyclohexylpropionitrile | 2,2'-azobis(2-cyclohexylpropionitrile) |
| 2-amino-4-carboethoxy-2-methylbutyronitrile | 2,2'-azobis(4-carboethoxy-2-methylbutyronitrile) |
| 1-aminocyclopentanecarbonitrile | 1,1'-azobis(cyclopentanecarbonitrile) |

EXAMPLE 12

De Benneville (U.S. Pat. No. 3,207,714) teaches the use of lower alcohols to solubilize the α-amino compounds and the hypochlorites in relatively large volumes of water. The tests in Example 12–A and 12–B compare the use of t-butyl alcohol and methanol in the substantially aqueous media of De Benneville with Example 12–C showing the azo coupling reaction of this invention in substantially alcoholic medium.

Test A

A sodium hypochlorite solution is prepared by passing 44.5 parts of chlorine into a solution of 75 parts of sodium hydroxide in 500 parts of water at 0°C. A solution of 67.2 parts of 93.4 percent 2-amino-2,4-dimethylpentanonitrile (0.50 moles) in 100 parts of tert-butyl alcohol is added thereto over a period of 20 minutes with stirring while the temperature is maintained at 10°C. At this point in the reaction t-butanol constitutes approximately 21 volume percent of the aqueous solvent. The resulting two liquid phase reaction system is then allowed to stand overnight at 5°C. The two liquid phase reaction mixture contains no solids. The two phases are separated giving 629 parts of an aqueous lower phase and 151 parts of organic upper phase.

To isolate the azo product, the aqueous phase is diluted with 1,000 parts of water and 20 parts of sodium bisulfite is added. The bisulfite is used to eliminate the residual chloroamine byproduct. After agitating for 15 minutes, less than one part of solid is separated by filtration.

The organic phase is combined with the solid recovered from the aqueous phase and treated with a mixture of 398 parts of methanol, 300 parts of water and 100 parts of sodium bisulfite for 1 hour at a temperature below 10°C. This treatment eliminates the residual chloroamine compounds. The resulting reaction product is diluted with 500 parts of water and the precipitated 2,2'-azobis(2,4-dimethylpentanonitrile) is isolated by filtration, washed with 500 parts of water and dried. The 21.5 parts of azo compound recovered represents a yield of 34.7 percent based on the aminonitrile charged. Decomposition of the product at 100°C. with measurement of the nitrogen liberated establishes a 96.5 percent purity.

Test B

Test A is repeated substituting 100 parts of methanol for the 100 parts of tert-butyl alcohol. The volume percent alcohol is the same as in Test A. The two phase reaction product is worked up as described in Test A with the exception that the aqueous phase is discarded. No solid products are isolated from the reaction.

Test C

To 657 parts of methanol is added with agitation over a period of 20 minutes at −20°C. 66.7 parts of 94.5 percent 2-amino-2,4-dimethyl pentanonitrile (0.50 moles) with simultaneous addition of 375 parts of a 14.9 percent aqueous sodium hypochlorite solution (0.75 moles). During the addition the reaction temperature gradually increases to −5°C. The temperature of the reaction mass is allowed to rise to 10°C. and maintained for 20 minutes. At this point methanol constitutes 76 volume percent of the aqueous solvent. The resulting reaction product is diluted with 550 parts of water at a temperature below 10°C. and the precipitated 2,2'-azobis(2,4-dimethyl-pentanonitrile) is isolated by filtration, washed with 500 parts of water and dried. The 54.5 parts of azo compound recovered represents a yield of 87.8 percent based on the aminonitrile charged. Decomposition of the product at 100°C. with measurement of the nitrogen liberated establishes a 96.6 percent purity.

The following table summarizes the results of the tests of Example 12. The yield in Test A is low because the t-butanol salted out producing a two-liquid phase system in which the coupling reaction is inhibited. The yield in Test B is low because the chloroamine intermediates are insoluble in the reaction solvent and two liquid phases formed, inhibiting the coupling reaction. The yield in Test C shows the improvement gained using the process of this invention.

| Test | Organic Solvent | Volume Percent of Alcohol in the Aqueous Solvent at the end of the Coupling Reaction | Yield Azo Compound | Purity |
|---|---|---|---|---|
| A | t-butyl alcohol | 21% | 34.7% | 96.5% |
| B | methanol | 21% | 0 | — |
| C | methanol | 76% | 87.8% | 96.6% |

EXAMPLE 13

A similar comparative experiment was run with 1-aminocyclohexanecarbonitrile as the starting α-amino compound.

Test A

A sodium hypochlorite solution is prepared by passing 44.5 parts of chlorine into a solution of 75 parts of sodium hydroxide in 500 parts of water at 0°C. A solution of 68.1 parts of 91.13 percent 1-aminocyclohexanecarbonitrile (0.50 moles) in 100 parts of tert-butyl alcohol is added thereto over a period of 20 minutes with stirring while the temperature is maintained at 10°C. The resulting reaction product is then allowed to stand overnight at 5°C. At this point t-butyl alcohol constitutes 21 volume percent of the aqueous solvent. To isolate the azo product, the reaction product is filtered to separate the two phase liquid from the solids. The aqueous lower phase is separated and discarded. The organic upper phase is combined with the solids and treated with a mixture of 160 parts of methanol, 100 parts of water and 30 parts of sodium bisulfite for 1 hour at a temperature below 25°C. The bisulfite is used to decompose the residual chloroamine products. The resulting reaction product is diluted with 500 parts of water and the precipitated 1,1'-azobis(cyclohexanecarbonitrile) is isolated by filtration, washed with 500 parts of water and dried. The 28 parts of azo compound recovered represents a yield of 45.8 percent on the aminonitrile charged. Decomposition of the product at 150°C. with measurement of the nitrogen liberated establishes a 95.4 percent purity.

Test B

A sodium hypochlorite solution is prepared by passing 44.5 parts of chlorine into a solution of 75 parts of sodium hydroxide in 500 parts of water at 0°C. A solution of 68.1 parts of 91.13 percent 1-aminocyclohexanecarbonitrile (0.50 moles) in 100 parts of methanol is added thereto over a period of 20 minutes with stirring while the temperature is maintained at −10° to 0°C. The resulting reaction product is then allowed to stand overnight at 5°C. At this point methanol constitutes 21 volume percent of the aqueous solvent. The aqueous layer is separated from the solids and viscous oil and discarded. The solids and oil are dissolved in 240 parts of methanol and 100 parts of water. 50 parts of sodium bisulfite are added thereto and the mixture is agitated for 30 minutes at a temperature below 25°C. The bisulfite is used to eliminate residual chloroamine products. The resulting reaction product is diluted with 500 parts of water and the precipitated 1,1'-azobis(cyclohexanecarbonitrile) is isolated by filtration, washed with 600 parts of water and dried. The 3.5 parts of azo compound recovered represents a yield of 5.7 percent based on the aminonitrile charged. Decomposition of the product at 150°C. with measurement of the nitrogen liberated establishes a 55.6 percent purity.

Test C

To 795 parts of methanol is added with agitation over a period of 20 minutes at −10°C., 68.1 parts of 91.13 percent 1-aminocyclohexanecarbonitrile (0.50 moles)

with simultaneous addition of 450 parts of a 14.5 percent aqueous sodium hypochlorite solution (0.875 moles). During the addition the reaction temperature gradually increases to 0°C. The temperature of the reaction mass is allowed to rise to 10°C. and is maintained for 20 minutes. At this point methanol constitutes 76 volume percent of the aqueous solvent. The resulting reaction product is diluted with 670 parts of water at a temperature below 25°C. The precipitated 1,1'-bis(cyclohexanecarbonitrile) is isolated by filtration, washed with 500 parts of water and dried. The 56.7 parts of azo compound recovered represents a yield of 85.2 percent based on the aminonitrile charged. Decomposition of the product at 150°C. with measurement of the nitrogen liberated establishes a 98.8 percent purity.

The following table summarizes the results of the tests of Example 13, showing the superiority of the present process.

| Test | Organic Solvent | Volume Percent of Alcohol in the Aqueous Solvent at the end of the Coupling Reaction | Yield Azo Compound | Purity |
|---|---|---|---|---|
| A | t-butyl alcohol | 21% | 45.8% | 95.4% |
| B | methanol | 21% | 5.7% | 55.6% |
| C | methanol | 76% | 85.2% | 98.8% |

I claim:

1. A process for the preparation of symmetrical azo compounds of the following formula:

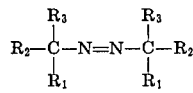   (1)

consisting essentially of contacting an amino compound of the following formula

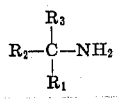   (2)

with a hypochlorite selected form sodium, potassium, and calcium hypochlorite in the presence of an aqueous solvent system which contains at the beginning of the reaction at least 95 percent by volume and at the end of the reaction at least 70 percent by volume of a $C_1$–$C_2$ alcohol, at a temperature above the freezing point of the reacting mixture and below 50°C., the molar ratio of the hypochlorite to the amino compound being within the range of 1.4 to 1.8, and separating the reaction product formed from said solution; $R_1$, $R_2$, and $R_3$ in the above formulae representing the following:

$R_1$ is selected from the group consisting of an alkyl of one to six carbon atoms and an alkyl of one to six carbon atoms substituted with one alkoxy group of one to four carbon atoms;

$R_2$ is alkyl of from one to six carbon atoms or cycloalkyl of from three to six carbon atoms; and $R_3$ is a radical selected from the group consisting of —CN, —COOR, and —COOM, R being an alkyl radical of from one to six carbon atoms and M being sodium or potassium;

with the proviso that $R_1$ and $R_2$ together contain a total of at least four carbon atoms; and with the further proviso that $R_1$ and $R_2$ can be taken together and are alkylene of from three to 11 carbon atoms.

2. The process of claim 1 wherein the alcohol is methanol.

3. The process of claim 1 wherein the starting amino compound is 1-aminocyclohexanecarbonitrile, and the azo compound product is 1,1'-azobis(cyclohexanecarbonitrile).

4. The process of claim 1 wherein the starting amino compound is 2-amino-2,4-dimethylpentanonitrile, and the azo compound product is 2,2'-azobis(2,4-dimethylpentanonitrile).

5. The process of claim 1 wherein the starting amino compound is 2-amino-4-methoxy-2,4-dimethylpentanonitrile, and the azo compound product is 2,2'-azobis(4-methoxy-2,4-dimethylpentanonitrile).

6. The process of claim 1 wherein the hypochlorite is prepared in situ from chlorine and the appropriate metal hydroxide.

7. The process of claim 1 wherein both the hypochlorite solution and the amino compound are added simultaneously to the alcohol, the rates of addition being such that the required molar ratio of the hypochlorite to the amino compound is maintained during the addition.

8. The process of claim 6, wherein the metal hydroxide solution, chlorine, and the amino compound are added simultaneously to the alcohol, the rates of addition being such that the required molar ratio of the nascent hypochlorite to the amino compound is maintained during the addition.

* * * * *